United States Patent [19]

Drasner

[11] Patent Number: 5,120,787
[45] Date of Patent: Jun. 9, 1992

[54] LOW MELT ETHYLENE VINYL ACETATE COPOLYMER FILM

[75] Inventor: Joseph Drasner, Beachwood, Ohio

[73] Assignee: J. Drasner & Co., Inc., Beachwood, Ohio

[21] Appl. No.: 726,258

[22] Filed: Jul. 5, 1991

[51] Int. Cl.$^5$ .............................................. C08L 31/04
[52] U.S. Cl. .................................... 524/524; 526/331
[58] Field of Search ......................... 526/331; 524/524

[56] References Cited

U.S. PATENT DOCUMENTS 4,619,848 10/1986 Knight et al. ........................ 524/524
4,997,880 3/1991 Van Der Groep ................. 524/524

FOREIGN PATENT DOCUMENTS 2521564 11/1975 Fed. Rep. of Germany ...... 524/524
1-223130 9/1989 Japan .................................. 524/524

*Primary Examiner*—Joseph L. Schofer
*Assistant Examiner*—N. Sarofin
*Attorney, Agent, or Firm*—Wood, Herron & Evans

[57] ABSTRACT

Ethylene vinyl acetate copolymer films having about 25%–33% by weight vinyl acetate and melting points of about 160°–170° F. are provided for packaging, lining or wrapping purposes. Low melt bags for rubber compounds and additives are made from the films.

5 Claims, No Drawings

5,120,787

LOW MELT ETHYLENE VINYL ACETATE COPOLYMER FILM

BACKGROUND OF THE INVENTION

In the packaging industry there is a particular need for a plastic film having low melt properties, sufficient strength and other handling characteristics. In particular, in the rubber industry, rubber dispersions with additives are premixed and weighed for packaging in plastic film bags. These plastic bags are presently made from polybutadiene, ethylene-methyl acrylate copolymer, polyolefin or ethylene vinyl acetate copolymers. In the rubber dispersion application, it is desired that the bag melt at the lowest possible temperature so that it will disperse completely in the rubber compound during mixing. If the bag does not melt completely, it will adversely affect processing and the performance of the resulting end product that is fabricated from the rubber compound. Also, high melting bags require disadvantageously higher heat histories on the rubber compound and higher energy costs.

Ethylene vinyl acetate copolymer bags are currently made from films whose lowest consistent melt temperature is about 185° F. or higher. These bags contain an ethylene vinyl acetate copolymer having about 18% vinyl acetate. Other known polymers or blends consistently produce films having melting points in the range of about 185–200° F., thereby resulting in unsatisfactory products. In attempting to achieve a low melt film, other properties in the film must be balanced in order to produce a satisfactory product. In addition to a low melting point, sufficient film strength or modulus must be achieved for use in packaging or handling. In addition, film chemical compatibility may be an important factor in certain industries such as the rubber compounding industry as above mentioned. Also, heat sealability of the film for wrapping or packaging purposes is important.

There is a continuing need for a low melt thermoplastic film that is suitable for many applications, particularly in the wrapping and packaging areas. Also there is a need for using low melting bags as compounding tub liners, where the resulting mixture and liner is added to a high intensive mixer. This insures that all ingredients go into the mixer, increases productivity because tub clean up between mix cycles is eliminated, and extends the wear life of the mixing tub or container. Other desirable properties needed in such films include heat sealability, chemical compatibility, and FDA acceptability.

SUMMARY OF THE INVENTION

This invention is directed to a low melt thermoplastic film of ethylene vinyl acetate copolymer (EVA). EVA copolymers, or blends thereof with a thermoplastic resin, where the vinyl acetate content is about 25–33% weight have been formed into films having a melting point below about 170° F. The melt index of the EVA copolymer is on the order of about 0.5 to about 7.0 g/10 min.-ASTM D 1238.

It has been found that an EVA copolymer film having a vinyl acetate content of at least about 25% by weight may be film formed to provide a thermoplastic film having a low melting point in the range of about 160–170° F. In particular, an EVA copolymer having a 28% vinyl acetate having a melt index of about 3 can produce a low melt film having a melting point below 170° F. The film may be rolled upon itself without sticking and heat sealed in packaging applications such as when making plastic bags. Films have thicknesses in the range of about 1 to about 10 mils, preferably about 1 to about 3 mils.

Bags made from the EVA copolymer film are suitable for packaging polymer compositions such as rubber dispersions and as compounding tub liners. Other polymers, additives or compounds may be packaged in these bags. The entire bag containing the rubber and additives may be used in high intensive mixers and the bag melts completely and disperses into the mixture. In addition to the low melting point characteristic of the film, chemical compatibility with rubber compounds or other polymers and additives is achieved. Furthermore, high intensive mixers can be run at lower temperatures, thereby minimizing heat history of the rubber or plastic compounds and reducing energy costs.

The composition of the EVA copolymer film generally contains about 50 to about 98 parts of EVA copolymer and about 50 to about 2 parts of a concentrate system. The concentrate system usually contains, but is not limited to, lubricants, fillers, slip agents, anti-block agents, and pigment toners dispersed in a thermoplastic resin binder. The thermoplastic resin of the concentrate may vary, but usually includes a polyolefin such as polyethylene, polypropylene, ethylene vinyl acetate copolymer or a thermoplastic elastomeric polymer. While a film may be formed from the EVA polymer without additives according to this invention, it is usually necessary to include additives in order to produce a film that may be wound and stored at ambient temperatures. Presently, concentrate systems contain metallic stearates or other fatty acid salts as lubricants. Fatty acid amides such as oleamide may also be included as slip agents. Fillers including diatomaceous earth, amorphous silica, and calcium carbonate may be included. Typically, polyethylene or polypropylene, especially a low density polyethylene, may be suitable for use in the concentrate as a binder for the additives and to enhance compatibility with the EVA polymer. The EVA polymer may be blended with other thermoplastic polymers such as those which may be present in the concentrate and formed into films. The EVA copolymer and any blend predominantly contains the EVA copolymer as part of the entire polymer mixture to obtain the low melt film. In a preferred form, the film composition contains about 85% EVA copolymer and about 15% concentrate on a parts by weight basis. Compositions may preferably range from about 70–98% by weight EVA copolymer and about 2–30% by weight concentrate.

The low melt film of this invention and various modifications thereof, its advantages and other aspects of this invention, will be further understood with reference to the following detailed description.

DETAILED DESCRIPTION

A low melt film according to this invention was made by formulating the following components:

EVA Copolymer

Ethylene vinyl acetate copolymer having a vinyl acetate content of about 28% by weight and a melt index of about 3.1 g/10 min.-ASTM D 1238 was employed on an 85 parts by weight basis with 15 parts by weight of the following concentrate formulation.

| Concentration Formulation | (% by Weight) |
|---|---|
| Zinc Stearate | 25.0 |
| Oleamide | 23.3 |
| Diatomaceous Earth | 66.6 |
| Calcium Carbonate | 100.0 |
| Low Density Polyethylene | 239.1 |
| | 454.0 |

The above EVA copolymer and concentrate formulation was extruded by blown film conditions wherein the extruder barrel positions were as follows:

| Extrusion Conditions | | | |
|---|---|---|---|
| Extrusion barrel Positions: | | | |
| #1 | 226° F. | Screen Changer #5 | 280° F. |
| #2 | 246° F. | Elbow Adaptor #6 | 280° F. |
| #3 | 258° F. | Rotator #7 | 280° F. |
| #4 | 280° F. | Rotator Neck #8 | 280° F. |
| | | Melt Temperature | 280° F. |

An approximate 21" diameter bubble was extruded with the resulting cut and trimmed film having about a 40" width and a thickness of approximately 2.25 mils. The film was run at about 250 lbs/hour to produce the finished film. Bags were made from the above extruded film and checked for processibility, heat sealability and ease of opening. Low melt films produced in accordance with these procedures had a melting point in the range of about 161°-69° F. or below about 170° F. The film also had proper slip and anti-block characteristics making it possible for bags to be formed and used for packaging or as a compounding tub liner.

The EVA copolymer film of this invention was compared with currently available film products and tested for melting point on a melting point meter, for example, Model 304 of Pacific Transducer Corporation. The melting point meter is designed to measure the melting point of the films by employing a platen bar. The platen bar heats up on a precisely designed temperature gradient and sample films are placed along the bar in order to determine the melt point of the film. By employing this apparatus, the following melting point information was obtained for different films of about 2 mils in thickness.

28% EVA copolymer film of this invention 160°-169° F.
1,2 syndiotactic polybutadiene 175°-185° F.
18% EVA copolymer 185°-190° F.
polyethylene 190°-200° F.
ethylene-methyl acrylate (EMA) 185°-190° F.

As may be determined with reference to the above data, a low melt film has been provided according to the principles of this invention having a melting point below about 170.F. The EVA copolymer film may be formed into bags for polymer compositions such as rubber and plastic additives. Bags may be introduced into high intensive mixers and run at low temperatures, thereby minimizing the heat history of rubber compounds and reducing energy costs. The low melt plastic film may be wound into rolls, stored at ambient temperatures and made into bags that are heat sealable under acceptable conditions. Furthermore, the EVA copolymer film is FDA acceptable.

Other modifications or variations may be made to this invention without departing from its scope as will be evident in view of the above description to a person of ordinary skill in this art.

What is claimed is:

1. A method of compounding a rubber compound comprising providing a plastic bag or liner made form a film of an ethylene vinyl acetate copolymer having a vinyl acetate content of at least about 25% by weight, said copolymer having a melt index suitable for film formation, said film having a melting point below about 170° F. and placing a rubber compound and additives mixture into said bag or liner, adding said bag or liner containing said rubber mixture directly into a mixer, compounding the bag or liner mixture in said mixer at temperatures to melt the ethylene vinyl acetate copolymer of said bag or liner throughout the rubber mixture without affecting the properties of the rubber compound and thereby minimizing the heat history of said rubber compound and reducing energy costs.

2. The method of claim 1 wherein said film has a vinyl acetate content of about 25% to about 33% by weight, a melt index of about 0.5 to about 7 g/10 min as determined by ASTM D 1238, and said melting point in the range of about 160°-170° F.

3. The method of claim 1 wherein said film contains an additive selected form the group consisting of a lubricant, filler, slip agent, anti-block agent, pigment and thermoplastic resin, and mixtures thereof.

4. The method of claim 1 wherein said bag or liner is for lining a container for receiving said mixture.

5. The method as in claim 3 wherein said copolymer is contained in an amount of 85% by weight and said mixture of additives is contained in an amount of about 15% by weight.

* * * * *

UNITED STATES PATENT AND TRADEMARK OFFICE
CERTIFICATE OF CORRECTION

PATENT NO.  : 5,120,787
DATED       : June 9, 1992
INVENTOR(S) : Joseph Drasner

It is certified that error appears in the above-identified patent and that said Letters Patent is hereby corrected as shown below:

Column 3, line 31, "161°-69°F" should be --161°-169°F--

Column 4, line 2, "about 170.F" should be --about 170°F--

Column 4, line 20, "made form a film" should be --made from a film--

Column 4, line 44, "selected form the group" should be --selected from the group--

Signed and Sealed this

Tenth Day of August, 1993

Attest:

MICHAEL K. KIRK

Attesting Officer

Acting Commissioner of Patents and Trademarks